(12) United States Patent
Prata

(10) Patent No.: US 12,606,010 B2
(45) Date of Patent: Apr. 21, 2026

(54) VEHICLE EQUIPPED WITH A WIND POWER ELECTRICITY GENERATOR

(71) Applicant: PRATA BRUNO DESIGN, Chatelaillon Plage (FR)

(72) Inventor: Bruno Prata, Chatelaillon Plage (FR)

(73) Assignee: PRATA BRUNO DESIGN, Chatelaillon Plage (FR)

( * ) Notice: Subject to any disclaimer, the term of this patent is extended or adjusted under 35 U.S.C. 154(b) by 251 days.

(21) Appl. No.: 18/228,958

(22) Filed: Aug. 1, 2023

(65) Prior Publication Data

US 2025/0043769 A1 Feb. 6, 2025

(51) Int. Cl.
| | |
|---|---|
| B60K 11/08 | (2006.01) |
| B60K 11/06 | (2006.01) |
| B60K 16/00 | (2020.01) |
| B60L 8/00 | (2006.01) |
| F03D 9/32 | (2016.01) |

(52) U.S. Cl.
CPC ............ B60K 11/085 (2013.01); B60K 11/06 (2013.01); B60K 2016/006 (2013.01); B60L 8/006 (2013.01); F03D 9/32 (2016.05)

(58) Field of Classification Search
CPC .............. B60L 8/006; B60K 2016/006; B60K 11/06–085; F03D 9/32
See application file for complete search history.

(56) References Cited

U.S. PATENT DOCUMENTS

| | | | |
|---|---|---|---|
| 4,314,160 | A | 2/1982 | Boodman et al. |
| 4,424,452 | A | 1/1984 | Francis |
| 2012/0234612 | A1 | 9/2012 | Samuel |

FOREIGN PATENT DOCUMENTS

| | | | | |
|---|---|---|---|---|
| BE | 886028 A | | 3/1981 | |
| DE | 3038879 A1 | | 5/1982 | |
| DE | 10 2011 121 941 A1 | | 6/2013 | |
| DE | 10 2018 006 408 A1 | | 2/2020 | |
| EP | 3 365 222 A1 | | 8/2018 | |
| JP | H06344956 A | * | 12/1994 | |
| JP | 2003-269319 A | | 9/2003 | |
| JP | 2012211559 A | * | 11/2012 | |
| KR | 20220087594 A | * | 6/2022 | .............. B60L 58/26 |
| WO | WO-2008129190 A1 | * | 10/2008 | ........... B60K 11/085 |
| WO | 2011/011856 A1 | | 2/2011 | |
| WO | 2021/171213 A1 | | 9/2021 | |

* cited by examiner

*Primary Examiner* — James J Taylor, II
(74) *Attorney, Agent, or Firm* — ALLEN, DYER, DOPPELT, + GILCHRIST, P.A. Attorneys at Law

(57) ABSTRACT

A vehicle has a drive device to move the vehicle and a cooling device to cool the drive device. A duct is arranged to catch air flow striking a front of the vehicle and cool the cooling device with the air flow. A wind power electricity generator is configured to produce power. A control circuit connected to a blanking plate controls the value of the useful cross-section of the duct at least according to an electric power produced by the electricity generator and a speed of the vehicle. The control circuit reduces the useful cross-section of the duct so that the electric power generated by the electricity generator does not exceed a maximum power. The control circuit prevents rotation of the at least one blade when a speed of the air flow in the duct is lower than a threshold minimum speed.

7 Claims, 1 Drawing Sheet

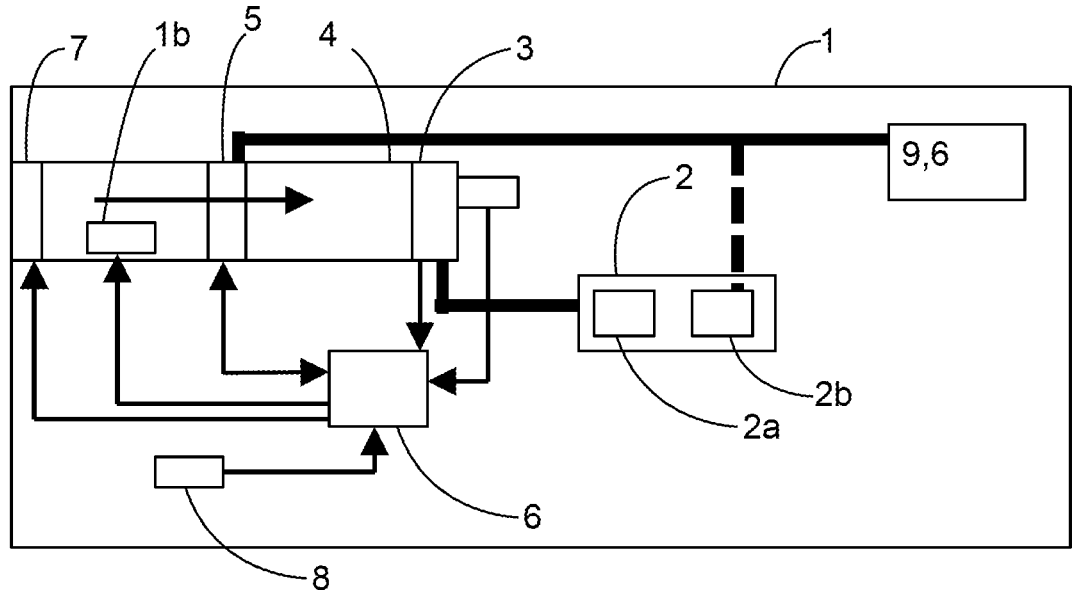

VEHICLE EQUIPPED WITH A WIND POWER ELECTRICITY GENERATOR

BACKGROUND OF THE INVENTION

The invention relates to a vehicle equipped with a wind power electricity generator.

PRIOR ART

In conventional manner, a vehicle is equipped with a drive device. The drive device drives a motor vehicle, for example a car, a truck, or an airplane.

When the vehicle moves, it moves in relation to the outside air which generates friction. Different technical solutions have been proposed to take advantage of the speed difference between the vehicle and the outside air. Wind turbines have been installed on cars or trucks to take advantage of the speed of the wind. The document U.S. Pat. No. 4,314,160, document WO2011/011856 or document U.S. Pat. No. 4,424,452 can be cited which propose fitting a wind turbine on the roof of the vehicle. This technical solution is counter-productive as the wind turbine is mounted salient from the bodywork which greatly increases the friction, the weight of the vehicle and therefore the power consumption of the drive device to reach the same reference speed. The additional cost of consumption is not compensated by the wind turbine.

The document BE886028 discloses an electric vehicle that has a wind turbine used to recharge the vehicle batteries. The document JP2003-269319 also discloses an automobile having wind turbines mounted in the front portion and providing electric power.

The document DE3038879 discloses an electric vehicle equipped with two wind turbines and an auxiliary combustion engine. A wind turbine is used to supply the headlamps, the indicators, the windshield wipers and other lighting and current collector. The other wind turbine is used for moving the vehicle.

OBJECT OF THE INVENTION

One object of the invention consists in improving the integration of a wind power electricity generator in a vehicle and in particular in improving the energy efficiency of the vehicle.

This problem tends to be solved by means of a vehicle that comprises:

a drive device configured to move the vehicle;
a cooling device configured to at least partially cool the drive device;
a duct arranged to catch an air flow striking a front part of the vehicle, the duct opening out facing the cooling device to cool the cooling device by means of the air flow, the air flow flowing in the duct in a first direction;
a wind power electricity generator having at least one blade and configured to produce electric power when the at least one blade is struck by the air flow.

The vehicle is remarkable in that:

the electricity generator is arranged in the duct upstream from the cooling device in the first direction;
a control circuit is configured to prevent rotation of the at least one blade when a speed of the air flow in the duct is lower than a threshold minimum speed and/or when a speed of the vehicle is lower than a threshold minimum speed and in that the control circuit is configured to limit the power produced by the electricity generator to a maximum power.

According to one feature of the invention, the vehicle comprises a blanking plate arranged upstream from the duct to adjust the useful cross-section of the duct and the control circuit is connected to the blanking plate, the control circuit being configured to reduce the value of the useful cross-section of the duct so that the delivered power does not exceed the maximum power.

In advantageous manner, the control circuit is connected to a speed sensor and the control circuit is configured to prevent rotation of the electricity generator when the speed sensor indicates a lower speed than a minimum speed In a particular configuration, the drive device comprises at least one battery and at least one electric motor driving at least one wheel or a propeller in rotation and the cooling device cools the at least one battery Preferentially, the drive device comprises at least one fuel cell and the cooling device cools the at least one fuel cell.

According to one embodiment, the drive device comprises at least one combustion engine and the cooling device cools the at least one combustion engine.

According to another embodiment, the vehicle comprises a temperature sensor configured to measure the temperature of the cooling device wherein the control circuit is configured to increase the value of the useful cross-section of the duct when the temperature of a fluid of the cooling device exceeds a threshold value

BRIEF DESCRIPTION OF THE DRAWINGS

Other advantages and features will become more clearly apparent from the following description of particular embodiments and implementation modes of the invention given for non-restrictive example purposes only and represented in the appended drawings, in which:

FIG. 1 schematically illustrates a vehicle comprising an electricity generator fitted in a duct supplying a cooling device.

DESCRIPTION OF THE EMBODIMENTS

A vehicle 1 is a road-going, aerial or railway vehicle. Preferably, the vehicle 1 is a motor vehicle, i.e. a vehicle that moves under its own power. The vehicle 1 has a drive device 2 that is configured to drive the vehicle 1. The drive device 2 has a motor 2a and a supply means 2b. The supply means 2b supplies energy or a medium able to be transformed into energy, for example a battery containing electricity, a tank containing hydrogen or a petroleum product such as petrol or gasoil. Depending on the configurations, the drive device 2 is a thermal drive device, an electric drive device, a hybrid thermal-electric drive device, a fuel cell drive device, a hybrid drive device with a fuel cell and a battery and/or a combustion engine.

The vehicle 1 can be a car, a truck, a utility vehicle, a train, a subway, a tramway, or an airplane.

The vehicle 1 has a cooling device 3 that is configured to cool the drive device 2 at least partly. In operation, the drive device 2 generates a large quantity of heat which makes it necessary to cool at least a part of the drive device 2. When the drive device 2 has a combustion engine, it is important to have a cooling device 3 that cools the combustion engine and possibly other elements of the drive device 2. When the drive device 2 has an electric motor that enables the vehicle 1 to be moved, it is important for the cooling device 3 to cool the battery supplying the motor 2a. When the drive device 2 has a fuel cell, it is important to have a cooling device 3 that cools the fuel cell.

The vehicle 1 also has a duct 4 that is arranged to catch an air flow striking a front part of the vehicle 1. The duct 4 opens out facing the cooling device 3 to cool the cooling device 3 by means of the air flow, the air flow flowing in the duct 4 in a first direction represented by an arrow. As in vehicles of the prior art, the duct 4 is configured to channel the air flow from the front of the vehicle 1 to the cooling device 3 so as to provide an air that is cooler than the cooling device 3. When the vehicle 1 moves forwards, the air enters the duct 4 and is pushed towards the cooling device 3. The cool air enables the heat produced by the drive device 2 to be removed cooling the cooling device 3. The duct 4 enables the air flow to flow in a first direction from the front of the vehicle 1 to the cooling device 3.

In vehicles of the prior art, an air flow is used only to cool the cooling device 3. According to the invention, the vehicle 1 has an electricity generator 5 that is of wind power type and that has at least one blade. The electricity generator 5 is configured to produce electric power when the at least one blade is struck by the air flow.

In order not to penalise the aerodynamic penetration coefficient, the electricity generator 5 is arranged in the duct 4 upstream from the cooling device 3 in the first direction. The air that enters the duct 4 strikes the electricity generator 5 before striking the cooling device 3. By installing the electricity generator 5 also called wind turbine or wind generator in the duct 4, the latter is installed inside the body of the vehicle 1 and more precisely in the duct 4 that supplies the fresh air to the cooling device 3. This enables the vehicle 1 not to be modified or to be less modified in order to integrate the electricity generator 5 thereby providing a more efficient electric power contribution.

The electricity generator 5 is arranged in the duct 4 which modifies the air flow in the duct 4. The electricity generator 5 has a significant effect on the efficiency of the cooling device 3. The vehicle 1 has a control circuit 6 that is configured to adjust the cooling and/or mechanical power of the air flowing in the duct 4 according to the requirements of the vehicle 1.

The control circuit 6 is configured to prevent rotation of the at least one blade when a speed of the air flow in the duct 4 is lower than a threshold minimum speed and/or the speed of the vehicle 1 is lower than a threshold minimum speed.

When the vehicle 1 moves at low speed, the heat removal induced by the cooling device 3 is low, and it is therefore important for the electricity generator 5 not to introduce a significant pressure loss. It is therefore preferable to use the air flow in the duct 4 to cool the cooling device 3. When the air flow in the duct 4 is lower than a threshold minimum speed and/or the speed of the vehicle 1 is lower than the threshold speed, this corresponds to a vehicle 1 that is moving at low speed which is assimilated to a vehicle 1 moving in city traffic, i.e. with continual acceleration, deceleration and stopping phases. Under these conditions, the drive device 2 is greatly stressed which tends to increase the temperature of the drive device 2. It is important to cool the drive device 2 efficiently. In a particular embodiment, the threshold minimum speed is equal to 40 km/h, even 50 km/h, or even 70 km/h for the threshold minimum speed of the vehicle 1 and/or for the threshold minimum speed of the air in the duct 4.

On the contrary, when the flow speed of the air flow is high in the duct 4, the electricity generator 5 produces a large quantity of electric power. It is then advantageous to take full advantage of the mechanical power supplied by the air flow to run the electricity generator 5 and produce electricity.

The electric power delivered by the electricity generator 5 depends on the power supplied by the air flow until a threshold maximum power defined by the configuration of the electricity generator 5 is reached.

When the speed of the vehicle 1 is higher than the threshold minimum speed and/or the flow speed of the air in the duct 4 is higher than the threshold minimum speed, it is considered as being a vehicle 1 running freely on the road network, for example on the motorway network. In conventional manner, the speed of the vehicle 1 is relatively constant which translates into reduced cooling power requirements as regards what the air flow flowing in the duct 4 can supply. When the speed of the vehicle 1 is higher than the threshold minimum speed and/or the air flow speed in the duct 4 is higher than the threshold minimum speed, it is then advantageous to make the electricity generator 5 run to produce electricity.

However, when the electricity generator 5 is subjected to a too high air flow power, this makes the electricity generator run too fast and gives rise to mechanical problems. To avoid complicating the configuration of the electricity generator 5, it is proposed to limit the power produced by the electricity generator 5 to a threshold maximum power. The control circuit 6 is configured to limit the power produced by the electricity generator 5 to the threshold maximum power. It is advantageous to dimension the electricity generator 5 with respect to the threshold maximum power and thereby provide an electricity generator 5 having a very good efficiency when the threshold maximum power is delivered.

It is advantageous to define the threshold maximum power as being the power delivered by the electricity generator 5 when the vehicle 1 is running at a speed close to the maximum speed allowed on motorways or at a speed close to the latter. It is advantageous to define the threshold maximum power as corresponding to a maximum speed comprised between 110 and 140 km/h for a leisure vehicle 1, for example 130 km/h. It is advantageous to define a maximum speed comprised between 80 and 110 km/h for a truck, for example 90 km/h.

The control circuit 6 is preferentially configured to make the electricity generator 5 operate at the threshold maximum power when the speed of the vehicle 1 is higher than the set maximum speed to define the threshold maximum power and/or when the flow speed of the air in the duct 4 is higher than the set maximum speed. The control circuit 6 can be connected to a blanking plate 7 arranged upstream from the duct 4. The blanking plate 7 is configured to adjust the quantity of air that enters the duct 4 by adjusting the useful cross-section at the inlet of the duct 4. Reducing the useful cross-section at the inlet of the duct 4 enables the power applied to the electricity generator 5 to be reduced in spite of the increased speed of the air flow at the inlet of the duct.

The control circuit 6 is configured to control the value of the useful cross-section of the duct 4 at least according to an electric power produced by the electricity generator 5 and a speed of the vehicle 1. The control circuit 6 is configured to reduce the useful cross-section of the duct 4 so that the electric power generated by the electricity generator 5 does not exceed a maximum power. The blanking plate 7 enables the effective cross-section of the duct 4 to be maintained which limits the average speed of the air and therefore the power delivered to the electricity generator 5.

As a complement to or in an alternative embodiment, it is possible make the at least one blade of the electricity generator 5 swivel to reduce its exposure to the air flow. However, this configuration is more difficult to engineer.

By imposing the threshold speed minimum below which the electricity generator 5 does not operate and the maximum power to be delivered, it is possible to define the characteristics of the electricity generator 5 more precisely so that the latter presents a trade-off between its size, its weight and the accessible power range. It is then possible to produce an electricity generator 5 with performances that are better suited to the requirements. An optimised operation for light winds, as can be the case in conventional wind generators, is not sought for.

It is also possible to provide for the electricity generator 5 installed in a car to be different from the electricity generator 5 installed in a truck as the available space is different between a car and a truck as is the maximum authorised speed. It is also apparent that the constraint on the weight of the electricity generator 5 is not as critical in a truck in comparison with a car.

In a particular embodiment, the vehicle 1 comprises a speed sensor 8 that is configured to measure the instantaneous speed of the vehicle 1. It is advantageous for the control circuit 6 to be connected to a speed sensor configured to measure the speed of the vehicle 1 and for the control circuit 6 to be configured to reduce the value of the useful cross-section of the duct 4 when the speed sensor indicates a speed higher than a threshold maximum speed. It is then possible to use an electricity generator 5 the inclination of the blade or blades of which is fixed thereby reducing the cost of the electricity generator 5.

In a particular embodiment, the electricity generator 5 is configured to supply electric power to electric circuit 9 that supplies the different equipment of the vehicle 1, for example the interior and/or exterior lighting, the air conditioning, the on-board electronics, or the passenger compartment sound-proofing device. Electric circuit 9 is not configured to charge the battery of an electric vehicle or the battery of a vehicle powered by an internal combustion engine. By supplying power directly to the electrical equipment, loss of power related to the efficiency of the battery charging operation is avoided. Using the battery to supply the electric circuit does in fact generally involve transformation of the voltage delivered by the battery into a different voltage to supply the electrical equipment. The voltage delivered by the electricity generator is therefore transformed into a voltage acceptable by the battery and the voltage delivered by the battery is then transformed into a voltage acceptable by the electrical equipment.

In a particular embodiment, the electricity generator 5 is configured to supply electric power to the battery thereby charging the battery.

In preferred manner, the vehicle 1 comprises a temperature sensor that is configured to measure the temperature of the cooling device 3. The control circuit 6 is connected to the temperature sensor. The control circuit 6 is configured to prevent rotation of the electricity generator 5 when the temperature sensor detects that the measured temperature reaches a threshold value. The threshold value corresponds to a drive device 2 that is hot and highly stressed.

In one embodiment, the vehicle 1 is a road-going vehicle, for example a car, a utility vehicle or a truck comprising a plurality of wheels and the drive device 2 comprises one or more motors 2*a* that make the plurality of wheels rotate.

The invention claimed is:

1. A vehicle having:
   a drive device configured to move the vehicle;
   a cooling device configured to at least partially cool the drive device;
   a duct arranged to catch an air flow striking a front part of the vehicle, the duct opening out facing the cooling device to cool the cooling device by means of the air flow, the air flow being able to flow in the duct in a first direction from the front part to the cooling device;
   a wind power electricity generator having at least one blade, the wind power electricity generator producing electric power when the at least one blade is struck by the air flow, the wind power electricity generator being arranged in the duct upstream from the cooling device in the first direction;
   a control circuit configured to limit power produced by the electricity generator to a maximum power;
   wherein the control circuit is further configured to prevent rotation of the at least one blade when a speed of the air flow in the duct is lower than a threshold minimum speed or when a speed of the vehicle is lower than a threshold minimum speed.

2. The vehicle according to claim 1 comprising a blanking plate arranged upstream from the duct to adjust a useful cross-section of the duct, and wherein the control circuit is connected to the blanking plate, the control circuit being configured to reduce a value of the useful cross-section of the duct so that the delivered power does not exceed the maximum power.

3. The vehicle according to claim 1 wherein the control circuit is connected to a speed sensor configured to measure a speed of the vehicle.

4. The vehicle according to claim 1 wherein the drive device comprises at least one battery and at least one electric motor driving at least one wheel or a propeller in rotation, and wherein the cooling device cools the at least one battery.

5. The vehicle according to claim 1 wherein the drive device comprises at least one fuel cell, and wherein the cooling device cools the at least one fuel cell.

6. The vehicle according to claim 1 wherein the drive device comprises at least one combustion engine, and wherein the cooling device cools the at least one combustion engine.

7. The vehicle according to claim 1 comprising a temperature sensor configured to measure a temperature of a fluid of the cooling device, wherein the control circuit is configured to increase a value of a useful cross-section of the duct when the temperature of the fluid of the cooling device exceeds a threshold value.

* * * * *